(12) United States Patent
Tsuchida et al.

(10) Patent No.: US 11,189,837 B2
(45) Date of Patent: Nov. 30, 2021

(54) METAL POROUS BODY AND METHOD FOR MANUFACTURING METAL POROUS BODY

(71) Applicant: SUMITOMO ELECTRIC TOYAMA CO., LTD., Imizu (JP)

(72) Inventors: Hitoshi Tsuchida, Imizu (JP); Toshitaka Nakagawa, Imizu (JP); Junichi Nishimura, Imizu (JP)

(73) Assignee: SUMITOMO ELECTRIC TOYAMA CO., LTD., Imizu (JP)

( * ) Notice: Subject to any disclaimer, the term of this patent is extended or adjusted under 35 U.S.C. 154(b) by 106 days.

(21) Appl. No.: 16/647,256

(22) PCT Filed: Jul. 2, 2019

(86) PCT No.: PCT/JP2019/026263
§ 371 (c)(1),
(2) Date: Mar. 13, 2020

(87) PCT Pub. No.: WO2020/044776
PCT Pub. Date: Mar. 5, 2020

(65) Prior Publication Data
US 2020/0274170 A1 Aug. 27, 2020

(30) Foreign Application Priority Data
Aug. 29, 2018 (JP) .............................. JP2018-159982

(51) Int. Cl.
*H01M 4/80* (2006.01)
*B23K 20/04* (2006.01)
(Continued)

(52) U.S. Cl.
CPC ............ *H01M 4/808* (2013.01); *B21D 39/03* (2013.01); *B23K 20/04* (2013.01); *H01M 4/661* (2013.01);
(Continued)

(58) Field of Classification Search
CPC ...... H01M 4/808; H01M 4/661; B21D 39/03; B23K 20/04; B23K 2101/36;
(Continued)

(56) References Cited

U.S. PATENT DOCUMENTS

2001/0028978 A1   10/2001   Inoue et al.
2012/0067731 A1   3/2012    Hosoe et al.
(Continued)

FOREIGN PATENT DOCUMENTS

EP   0867248 A1   9/1998
JP   H05-031446 A   2/1993
(Continued)

OTHER PUBLICATIONS

Kanda, Eiko, JP2010090416A Machine translation (Year: 2010).*

*Primary Examiner* — Lee A Holly
(74) *Attorney, Agent, or Firm* — Oliff PLC

(57) ABSTRACT

A metal porous body having a connection portion where end portions in a longitudinal direction X of at least two long sheet-shaped metal porous materials are connected in a manner overlapping with each other, each of the metal porous materials having a frame with a three-dimensional network structure, the metal porous body having a recess with a thickness thinner than a thickness of each of the metal porous materials, in the connection portion, the frames of the at least two metal porous materials being entangled with each other, in the recess.

9 Claims, 13 Drawing Sheets

(51) Int. Cl.
   *B21D 39/03*    (2006.01)
   *H01M 4/66*     (2006.01)
   *B23K 101/36*   (2006.01)
   *B23K 103/08*   (2006.01)

(52) U.S. Cl.
   CPC ...... *B23K 2101/36* (2018.08); *B23K 2103/08* (2018.08)

(58) Field of Classification Search
   CPC ... B23K 2103/08; B21C 47/247; B22F 5/006; B22F 3/1103; B22F 3/18; B22F 7/002; Y02E 60/10; C22C 1/08
   See application file for complete search history.

(56) References Cited

U.S. PATENT DOCUMENTS

| | | |
|---|---|---|
| 2013/0231754 A1 | 9/2013 | Daigo et al. |
| 2018/0093318 A1 | 4/2018 | Hiraiwa et al. |

FOREIGN PATENT DOCUMENTS

| | | | |
|---|---|---|---|
| JP | 2001-297747 A | | 10/2001 |
| JP | 2001-328172 A | | 11/2001 |
| JP | 2008-170197 A | | 7/2008 |
| JP | 2010-90416 A | | 4/2010 |
| JP | 2010090416 A | * | 4/2010 |
| JP | 2011-216373 A | | 10/2011 |
| JP | 2011-225950 A | | 11/2011 |
| JP | 2012-186033 A | | 9/2012 |
| WO | 2012/063906 A1 | | 5/2012 |
| WO | 2016/170805 A1 | | 10/2016 |

* cited by examiner

METAL POROUS BODY AND METHOD FOR MANUFACTURING METAL POROUS BODY

TECHNICAL FIELD

The present disclosure relates to a metal porous body and a method for manufacturing a metal porous body. The present application claims priority to Japanese Patent Application No. 2018-159982 filed on Aug. 29, 2018, the entire contents of which are incorporated herein by reference.

BACKGROUND ART

A sheet-shaped metal porous body having a frame with a three-dimensional network structure (hereinafter also simply referred to as a "metal porous body") is utilized for various applications such as a filter that requires heat resistance, a battery electrode plate, a catalyst carrier, and a metal composite. For example, Celmet (manufactured by Sumitomo Electric Industries, Ltd., registered trademark), which is a metal porous body made of nickel, is widely adopted in various industrial fields, as an electrode of an alkaline storage battery such as a nickel hydrogen battery, a carrier for an industrial deodorizing catalyst, and the like. In addition, Aluminum-Celmet (manufactured by Sumitomo Electric Industries, Ltd., registered trademark), which is a metal porous body made of aluminum, can be used as a positive electrode of a lithium ion battery, because it is stable even in an organic electrolytic solution.

As a method for manufacturing the metal porous body, the metal porous body can be manufactured by performing conductive treatment on a surface of a frame of a resin porous body, then performing electroplating treatment to provide metal plating on the surface of the frame of the resin porous body, and then removing the resin porous body (see, for example, Japanese Patent Laying-Open No. H05-031446 (PTL 1) and Japanese Patent Laying-Open No. 2011-225950 (PTL 2)).

CITATION LIST

Patent Literature

PTL 1: Japanese Patent Laying-Open No. H05-031446
PTL 2: Japanese Patent Laying-Open No. 2011-225950
PTL 3: Japanese Patent Laying-Open No. 2001-297747
PTL 4: Japanese Patent Laying-Open No. 2011-216373

SUMMARY OF INVENTION

A metal porous body in accordance with one aspect of the present disclosure is a metal porous body having a connection portion where end portions in a longitudinal direction of at least two long sheet-shaped metal porous materials are connected in a manner overlapping with each other, each of the metal porous materials having a frame with a three-dimensional network structure, the metal porous body having a recess with a thickness thinner than a thickness of each of the metal porous materials, in the connection portion, the frames of the at least two metal porous materials being entangled with each other, in the recess.

A method for manufacturing a metal porous body in accordance with one aspect of the present disclosure is a method for manufacturing a metal porous body formed by connecting end portions in a longitudinal direction of at least two long sheet-shaped metal porous materials in a manner overlapping with each other, each of the metal porous materials having a frame with a three-dimensional network structure, the method including:

overlapping the end portions in the longitudinal direction of the metal porous materials with each other; and connecting the end portions in the longitudinal direction of the two metal porous materials, by performing processing using a rolling mill roll such that a thickness of the metal porous materials at an overlapped portion becomes equal to a thickness of each of the metal porous materials before the overlapping, and further performing processing using the rolling mill roll such that at least a portion of the thickness of the metal porous materials at the overlapped portion becomes thinner than the thickness of each of the metal porous materials before the overlapping.

DETAILED DESCRIPTION

Figure 1:
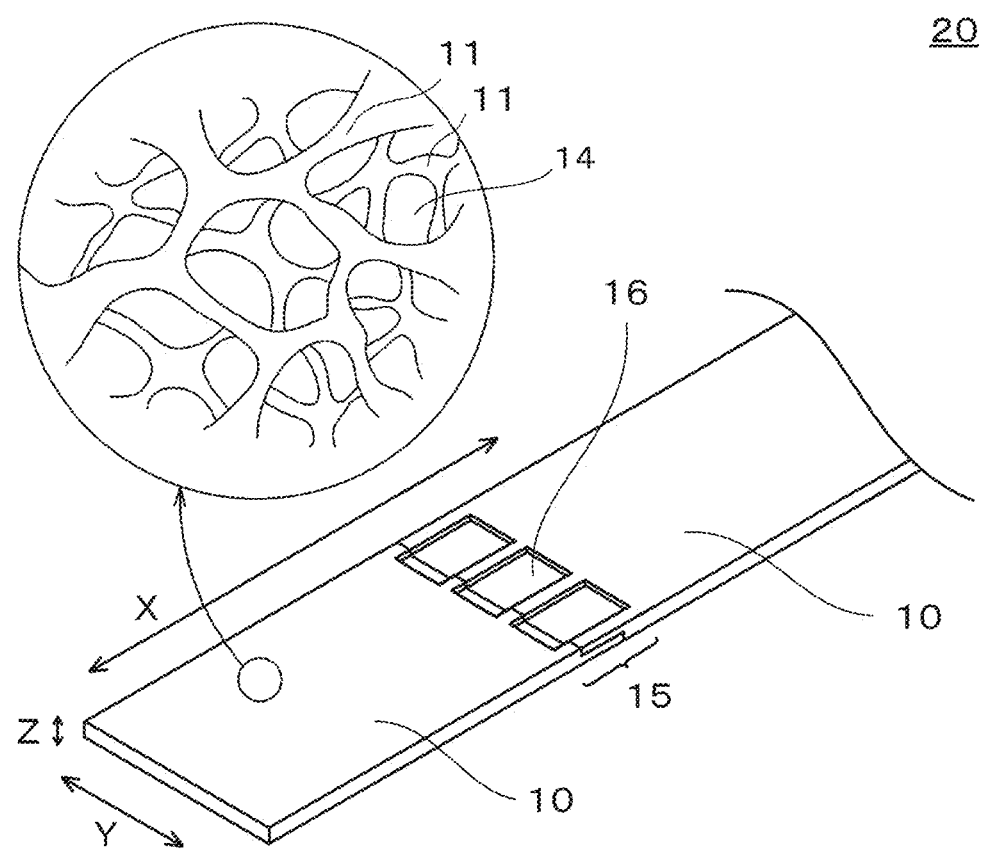
FIG. 1 is a view schematically showing one example of a metal porous body in accordance with an embodiment of the present disclosure.

Problem to be Solved by the Present Disclosure

When the metal porous body is industrially mass-produced, the metal porous body is continuously manufactured using a long sheet-shaped resin molded body as a base material. However, when a metal porous body having a length in a longitudinal direction of several hundreds of meters is manufactured, it is difficult to manufacture a metal porous body that does not have frame chipping, poor plating, and the like over the entire length thereof. Usually, a defective portion may occur at a rate of several portions per 100 meters. When such a defective portion occurs in a metal porous body, it is necessary to cut the metal porous body in a direction parallel to a short direction, at positions before and after the defective portion in the longitudinal direction, to remove the defective portion, and then connect end portions in the longitudinal direction of the cut metal porous bodies, to manufacture a long sheet-shaped metal porous body including no defective portion.

Generally, as methods for connecting sheet-shaped members, methods such as fusion joining, brazing, solid phase joining, mechanical joining (mechanical fastening), adhesion, and the like are known. However, since a metal porous body has a frame with the shape of a complicated three-dimensional network structure, these methods cannot connect metal porous bodies with a sufficient strength.

Japanese Patent Laying-Open No. 2001-297747 (PTL 3) discloses a method for joining a lead wire to a metal porous body by ultrasonic joining, and Japanese Patent Laying-Open No. 2011-216373 (PTL 4) discloses a method for joining a metal porous body and a belt-shaped body by ultrasonic joining, although they are not methods for connecting metal porous bodies.

Neither PTL 3 nor PTL 4 discloses a method for connecting metal porous bodies, and an apparatus utilizing ultrasonic joining is large in scale.

Accordingly, objects of the present disclosure are to provide a long sheet-shaped metal porous body formed by connecting metal porous bodies with a sufficient strength, and to provide a metal porous body manufacturing method capable of easily manufacturing the long sheet-shaped metal porous body.

Advantageous Effect of the Present Disclosure

According to the above disclosure, a long sheet-shaped metal porous body formed by connecting metal porous bodies with a sufficient strength can be provided, and a metal porous body manufacturing method capable of easily manufacturing the long sheet-shaped metal porous body can be provided.

DESCRIPTION OF EMBODIMENTS

First, aspects of the present disclosure will be described in list form.

(1) A metal porous body in accordance with one aspect of the present disclosure is a metal porous body having a connection portion where end portions in a longitudinal direction of at least two long sheet-shaped metal porous materials are connected in a manner overlapping with each other, each of the metal porous materials having a frame with a three-dimensional network structure, the metal porous body having a recess with a thickness thinner than a thickness of each of the metal porous materials, in the connection portion, the frames of the at least two metal porous materials being entangled with each other, in the recess.

According to the aspect of the disclosure according to (1) described above, a long sheet-shaped metal porous body formed by connecting metal porous bodies with a sufficient strength can be provided.

(2) Preferably, the metal porous body according to (1) described above has a length in the longitudinal direction of 100 m or more, and the number of the connection portions is 10 or less per 100 m of the length in the longitudinal direction of the metal porous body.

According to the aspect according to (2) described above, a long sheet-shaped metal porous body having a less number of the connection portions can be provided.

(3) Preferably, the metal porous body according to (1) or (2) described above has a plurality of the recesses, in the connection portion.

According to the aspect according to (3) described above, a metal porous body capable of fully securing the contact between the metal porous body and conveying rollers during conveyance of the metal porous body can be provided.

(4) Preferably, the metal porous body according to any one of (1) to (3) described above has a plurality of the recesses, and the plurality of the recesses are arranged at regular intervals, in the connection portion.

(5) Preferably, the metal porous body according to any one of (1) to (3) described above has a plurality of the recesses, and the plurality of the recesses are arranged in a checkered pattern, in the connection portion.

According to the aspects according to (4) and (5) described above, a metal porous body having a higher tensile strength in the connection portion while fully securing the contact between the metal porous body and the conveying rollers during conveyance of the metal porous body can be provided.

It should be noted that the "regular intervals" refer to a state where, when the length of a width between the recesses is defined as a pitch width, the ratio between the maximum pitch width and the minimum pitch width (maximum pitch width/minimum pitch width) is 2 or less.

(6) Preferably, in the metal porous body according to any one of (1) to (5) described above, the end portions in the longitudinal direction of the two metal porous materials overlap with each other, with another metal porous material being interposed therebetween as an intermediate layer, in the connection portion.

(7) Preferably, in the metal porous body according to (6) described above, an average pore diameter of the metal porous material constituting the intermediate layer is different from an average pore diameter of the connected two metal porous materials.

(8) Preferably, in the metal porous body according to any one of (1) to (7) described above, a tensile strength of the connection portion is higher than a tensile strength of the metal porous materials.

According to the aspect according to any one of (6) to (8) described above, a metal porous body having a higher tensile strength in the connection portion can be provided.

(9) A method for manufacturing a metal porous body in accordance with an embodiment of the present disclosure is a method for manufacturing a metal porous body formed by connecting end portions in a longitudinal direction of at least two long sheet-shaped metal porous materials in a manner overlapping with each other, each of the metal porous materials having a frame with a three-dimensional network structure, the method including:

overlapping the end portions in the longitudinal direction of the metal porous materials with each other; and connecting the end portions in the longitudinal direction of the two metal porous materials, by performing processing using a rolling mill roll such that a thickness of the metal porous materials at an overlapped portion becomes equal to a thickness of each of the metal porous materials before the overlapping, and further performing processing using the rolling mill roll such that at least a portion of the thickness of the metal porous materials at the overlapped portion becomes thinner than the thickness of each of the metal porous materials before the overlapping.

According to the aspect according to (9) described above, a metal porous body manufacturing method capable of easily manufacturing the long sheet-shaped metal porous body according to (1) described above can be provided.

DETAILS OF ASPECTS OF THE PRESENT DISCLOSURE

The metal porous body and the method for manufacturing the metal porous body in accordance with the aspects of the present disclosure will be described in more detail below. It should be noted that the present invention is not limited to these examples, but is defined by the scope of the claims, and is intended to include any modifications within the scope and meaning equivalent to the scope of the claims.

<Metal Porous Body>

FIG. 1 shows a schematic view of one example of a metal porous body in accordance with an embodiment of the present disclosure. As shown in FIG. 1, a metal porous body 20 in accordance with the embodiment of the present disclosure is metal porous body 20 having a connection portion 15 where end portions in a longitudinal direction X of at least two long sheet-shaped metal porous materials 10 are connected in a manner overlapping with each other. In addition, metal porous body 20 has a recess 16 with a thickness thinner than a thickness of each of metal porous materials 10, in connection portion 15. Connection portion 15 refers to a portion where connected two metal porous materials 10 overlap with each other, and, if recess 16 extends to an upstream side or a downstream side of the overlapping portion, connection portion 15 refers to a portion also including the extending region. Frames 11 of at least two metal porous materials 10 are entangled with each other, in recess 16.

It should be noted that a short direction Y of metal porous body 20 is a direction orthogonal to longitudinal direction X and a thickness direction Z of metal porous body 20 (see FIG. 1).

Each metal porous material 10 has frame 11 with a three-dimensional network structure, and has a long sheet-shaped external appearance as a whole. A pore portion 14 formed by frame 11 of metal porous material 10 is a communication pore formed to continue from a surface to the inside of metal porous material 10. It is only necessary that frame 11 is constituted by a film made of a metal or an alloy. Examples of the metal include nickel, aluminum, copper, and the like. In addition, examples of the alloy can include the metal alloyed with another metal added inevitably or intentionally.

As the metal porous material, Celmet (registered trademark) or Aluminum-Celmet (registered trademark) manufactured by Sumitomo Electric Industries, Ltd. can be preferably used. They are metal porous bodies made of nickel and aluminum, respectively, having a frame with a three-dimensional network structure manufactured by a so-called plating method.

It should be noted that the plating method is a method including performing conductive treatment on a surface of a frame of a resin molded body having the frame with a three-dimensional network structure, plating the surface of the frame of the resin molded body with a target metal, and removing the resin molded body, and is a known method.

Figure 2:
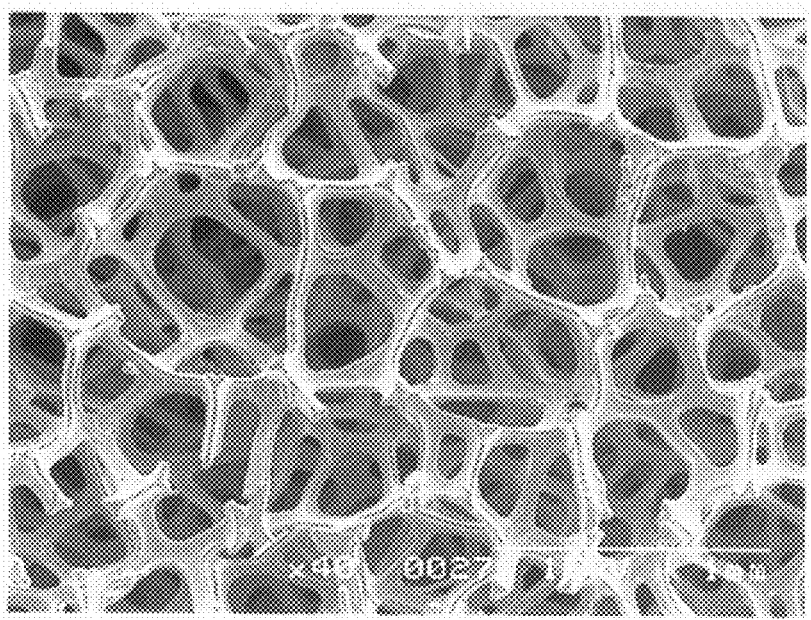
FIG. 2 is a cross-sectional photograph of one example of the metal porous body in accordance with the embodiment of the present disclosure.

FIG. 2 shows an enlarged photograph showing the frame with the three-dimensional network structure of one example of metal porous material 10. In addition, FIG. 3 shows an enlarged schematic view showing an enlarged cross section of the metal porous material shown in FIG. 2.

Figure 3:
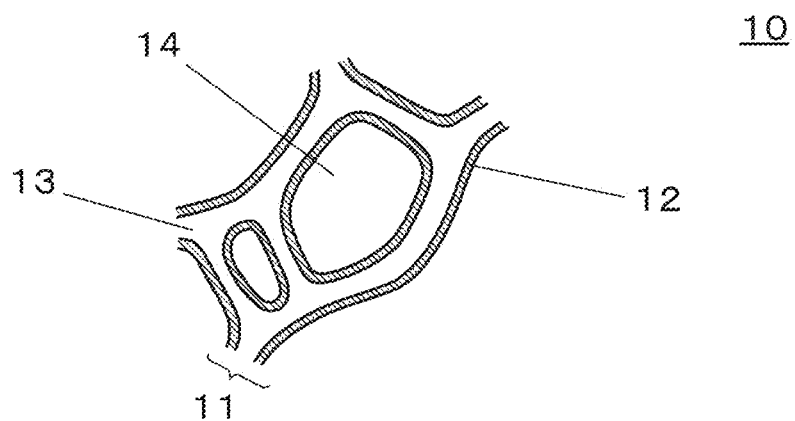
FIG. 3 is an enlarged view schematically showing a partial cross section of one example of the metal porous body in accordance with the embodiment of the present disclosure.

As shown in FIG. 3, frame 11 of metal porous material 10 is typically constituted by a film 12 made of a metal or an alloy, and an inside 13 of frame 11 is hollow. In addition, pore portion 14 formed by frame 11 is a communication pore, as described above.

The length in longitudinal direction X of metal porous body 20 in accordance with the embodiment of the present disclosure is not particularly limited, and may be about 60 m or more and about 600 m or less, for example. In addition, as the number of connection portions in the metal porous body decreases, a portion that can be utilized in the metal porous body increases, which is preferable.

From these viewpoints, it is preferable that metal porous body 20 in accordance with the embodiment of the present disclosure has a length in longitudinal direction X of 100 m or more, and that the number of connection portions 15 is 10 or less per 100 m of the length in longitudinal direction X of metal porous body 20. The number of connection portions 15 per 100 m of the length in longitudinal direction X of metal porous body 20 is preferably 4 or less, and more preferably 2 or less.

The thickness of metal porous body 20 in accordance with the embodiment of the present disclosure (the thickness of a portion other than recess 16) is not particularly limited, and may be selected as appropriate according to the application of the metal porous body. The thickness of metal porous body 20 can be measured with a digital thickness gauge, for example.

In many cases, by setting the thickness of the metal porous body to 0.1 mm or more and 3.0 mm or less, a lightweight and highly strong metal porous body can be obtained. From these viewpoints, the thickness of metal porous body 20 is more preferably 0.3 mm or more and 2.5 mm or less, and more preferably 0.4 mm or more and 2.0 mm or less.

It should be noted that the connection portion has a higher tensile strength when the thickness of recess 16 in connection portion 15 is thinner than the thickness of each metal porous material 10. Thus, the thickness of recess 16 is preferably 1/10 or more and 3/4 or less, more preferably 1/7 or more and 1/2 or less, and further preferably 1/5 or more and 1/3 or less, of the thickness of each metal porous material 10.

The average pore diameter of metal porous body 20 in accordance with the embodiment of the present disclosure is not particularly limited, and may be selected as appropriate according to the application of the metal porous body. It should be noted that the average pore diameter of metal porous body 20 refers to a value obtained by observing a surface of metal porous body 20 in at least 10 fields of view with a microscope or the like, to determine an average number (nc) of cell portions per inch (25.4 mm=25400 μm), and performing calculation by the following equation.

$$\text{Average pore diameter (μm)} = 25400 \text{ μm}/nc$$

When metal porous body 20 is cut and used as a current collector of a battery, for example, the average pore diameter of metal porous body 20 may be set in a range where a fill amount and a utilized amount of an active material that fills pore portion 14 are suitable. In addition, when metal porous body 20 is used as a filter, the average pore diameter is selected according to the size of particles to be captured.

In many cases, by setting the average pore diameter to 100 μm or more and 2000 μm or less, a lightweight and highly strong metal porous body can be obtained. From these viewpoints, the average pore diameter of metal porous body 20 is more preferably 200 μm or more and 700 μM or less, and further preferably 300 μm or more and 500 μm or less.

The porosity of metal porous body 20 in accordance with the embodiment of the present disclosure is not particularly limited, and may be selected as appropriate according to the application of the metal porous body. The porosity of metal porous body 20 is defined by the following equation.

$$\text{Porosity (\%)} = [1 - \{Mp/(Vp \times dp)\}] \times 100$$

Mp: mass of the metal porous body [g]

Vp: volume of the shape of an external appearance in the metal porous body [cm$^3$]

dp: density of the metal constituting the metal porous body [g/cm$^3$]

When metal porous body 20 is cut and used as a current collector of a battery, for example, the porosity of metal porous body 20 may be set in a range where the fill amount and the utilized amount of the active material that fills pore portion 14 are suitable.

In many cases, by setting the porosity to 40% or more and 98% or less, a lightweight and highly strong metal porous body can be obtained. From these viewpoints, the porosity of metal porous body 20 is more preferably 70% or more and 98% or less, and further preferably 90% or more and 98% or less.

The basis weight of metal porous body 20 in accordance with the embodiment of the present disclosure is not particularly limited, and may be selected as appropriate according to the application of the metal porous body. It should be noted that the basis weight of metal porous body 20 refers to a mass of metal porous body 20 in an apparent unit area. In the case of manufacturing a metal porous body having the same thickness, the tensile strength in connection portion 15 can be increased by increasing the basis weight. On the other hand, if the basis weight is increased too much, it leads to an increase in manufacturing cost.

The basis weight of metal porous body 20 in accordance with the embodiment of the present disclosure is preferably 150 g/m$^2$ or more and 1000 g/m$^2$ or less, more preferably 200 g/m$^2$ or more and 800 g/m$^2$ or less, and further preferably 250 g/m$^2$ or more and 500 g/m$^2$ or less.

Figure 4:
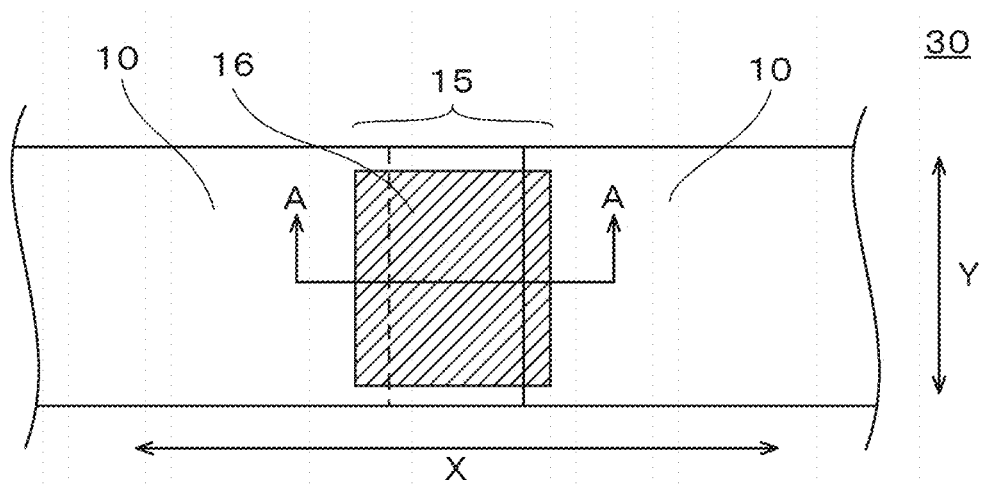
FIG. 4 is a plan view schematically showing one example of a connection portion in the metal porous body in accordance with the embodiment of the present disclosure.
Figure 5:
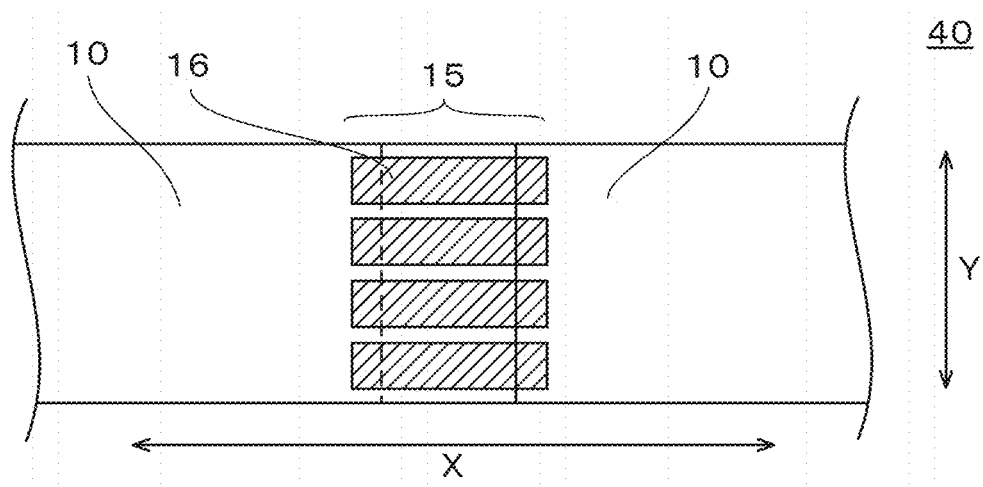
FIG. 5 is a plan view schematically showing another example of the connection portion in the metal porous body in accordance with the embodiment of the present disclosure.
Figure 6:
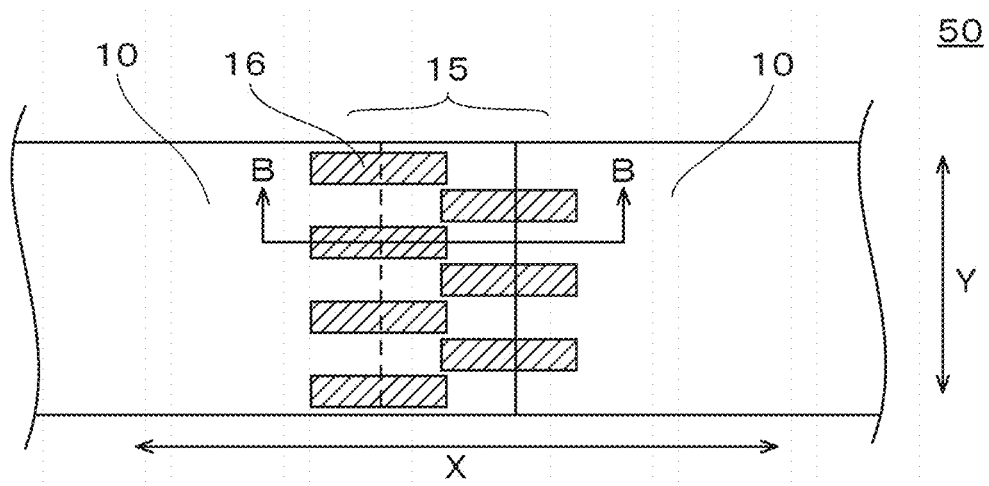
FIG. 6 is a plan view schematically showing still another example of the connection portion in the metal porous body in accordance with the embodiment of the present disclosure.

FIGS. 4, 5, and 6 schematically show configuration examples of the connection portion in the metal porous body in accordance with the embodiment of the present disclosure. FIGS. 4 to 6 are plan views showing connection portions 15 in metal porous bodies 30, 40, and 50, respectively, viewed from a top surface side, and each shaded portion indicates recess 16.

Metal porous body 30 has one recess 16 with a thickness thinner than the thickness of each of metal porous materials 10, in connection portion 15 where the end portions in longitudinal direction X of metal porous materials 10 are connected. In metal porous body 30, recess 16 is formed at a substantially central portion in short direction Y, and both end portions in short direction Y have substantially the same thickness as the thickness of each of metal porous materials 10. In addition, in longitudinal direction X of metal porous body 30, recess 16 is formed in a range wider than the portion where the end portions in longitudinal direction X of metal porous materials 10 overlap with each other.

Figure 7:
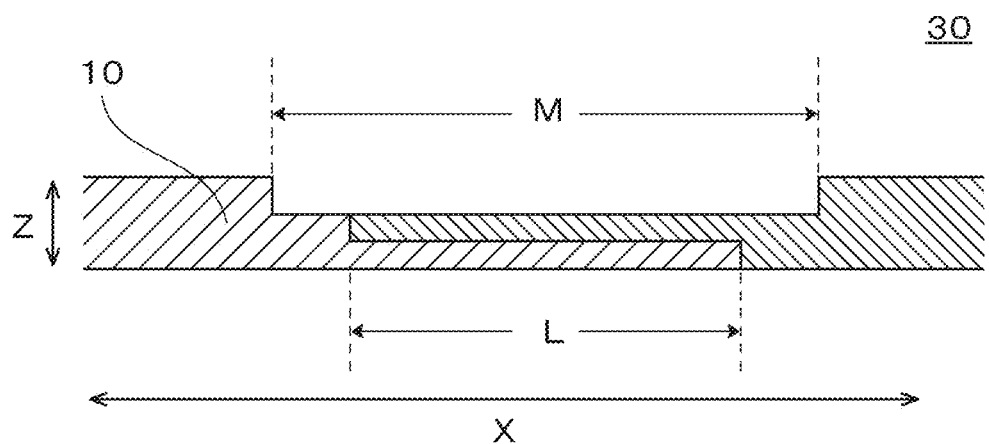
FIG. 7 is a view schematically showing a cross section along a line A-A of the metal porous body shown in FIG. 4.

FIG. 7 shows a cross sectional view of recess 16 in metal porous body 30 (a cross sectional view along a line A-A in FIG. 4). As shown in FIG. 7, the thickness of recess 16 in metal porous body 30 is thinner than the thickness of each of metal porous materials 10. In addition, in metal porous body 30, a length M of recess 16 in longitudinal direction X is longer than a length of a stacked region L where the end portions in longitudinal direction X of metal porous materials 10 are stacked, and recess 16 is formed to cover both end portions in longitudinal direction X of stacked region L.

In the metal porous body in accordance with the embodiment of the present disclosure, although the number of recesses 16 in connection portion 15 may be one as in metal porous body 30, it is more preferable that a plurality of recesses 16 are formed in connection portion 15. Since the thickness of recess 16 is thinner than the thickness of each of metal porous materials 10 as described above, when metal porous materials 10 are sandwiched between upper and lower conveying rollers and conveyed, a recess as a portion of the metal porous body constituting recess 16 cannot come into contact with the conveying rollers. Accordingly, in a case where only one large recess 16 is formed in connection portion 15, when connection portion 15 comes to the conveying rollers during conveyance of the metal porous body, there may be a possibility that the conveying rollers cannot convey the metal porous body, which may cause an idle rotation (a slip). In order to avoid such a possibility, it is effective to decrease the area of recess 16 and increase the contact area between the metal porous body and the conveying rollers in connection portion 15. However, in that case, the tensile strength of recess 16 is decreased. Accordingly, in connection portion 15 of the metal porous body, it is preferable to form a plurality of recesses 16 having a relatively small area and a plurality of portions having substantially the same thickness as the thickness of each of metal porous materials in the overlapping portion. Thereby, the tensile strength in connection portion 15 can be maintained, while securing the contact between the metal porous body and the conveying rollers.

It should be noted that the ratio of the area of recess 16 to an overlapped area is preferably 50% or more and 75% or less, and more preferably 60% or more and 70% or less. In this range, the tensile strength in connection portion 15 can be maintained more reliably, while securing the contact between the metal porous body and the conveying rollers.

In a case where a plurality of recesses 16 are formed in connection portion 15 of the metal porous body, the pattern of arranging recesses 16 is not particularly limited. The pattern of arranging the plurality of recesses 16 may be selected as appropriate for the purpose of increasing the connection strength of connection portion 15, for example.

FIG. 5 shows a plan view of one example of the metal porous body in which the plurality of recesses 16 are formed in connection portion 15. In metal porous body 40 shown in FIG. 5, recesses 16 having a rectangular shape when viewed in plan view, formed in connection portion 15, are arranged at substantially regular intervals in short direction Y of the metal porous body.

In addition, FIG. 6 shows a plan view of another example of the metal porous body in which the plurality of recesses 16 are formed in connection portion 15. In metal porous body 50 shown in FIG. 6, recesses 16 having a rectangular shape when viewed in plan view, formed in connection portion 15, are arranged in a checkered pattern. It should be noted that, in the present disclosure, the checkered pattern includes not only a checkered pattern in a strict sense, but also a pattern in which recesses 16 have a rectangular shape as shown in FIG. 6, and a pattern in which corners of diagonally adjacent recesses 16 are spaced from each other.

Figure 8:
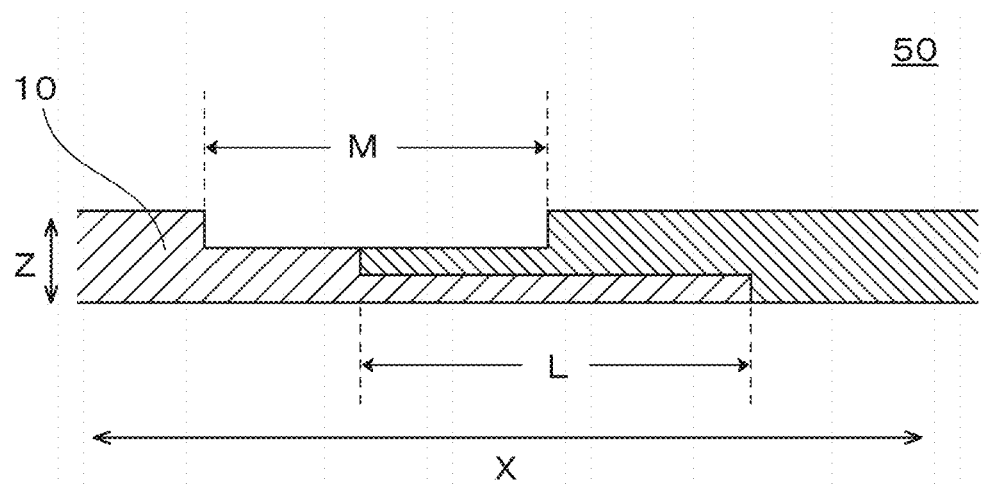
FIG. 8 is a view schematically showing a cross section along a line B-B of the metal porous body shown in FIG. 6.

FIG. 8 shows a cross sectional view of recess 16 in metal porous body 50 (a cross sectional view along a line B-B in FIG. 6). In metal porous body 50, length M of recess 16 in longitudinal direction X is substantially the same as the length of stacked region L where the end portions in longitudinal direction X of metal porous materials 10 are stacked. In addition, recess 16 in metal porous body 50 is formed to cover one end portion in longitudinal direction X of metal porous material 10 in stacked region L.

Figure 9:
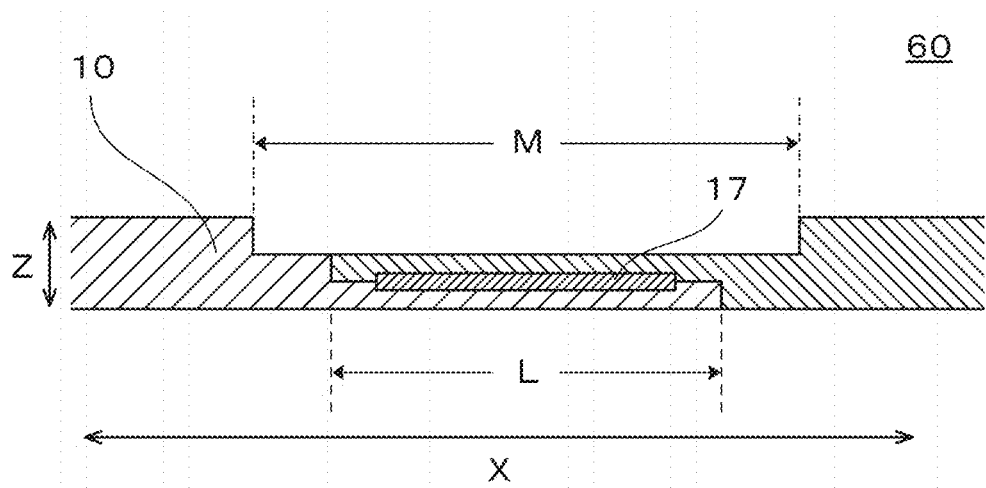
FIG. 9 is a view schematically showing a cross section of a connection portion in a metal porous body having an intermediate layer in the connection portion.

In the metal porous body in accordance with the embodiment of the present disclosure, the end portions in the longitudinal direction of the two metal porous materials may overlap with each other, with another metal porous material being interposed therebetween as an intermediate layer, in connection portion 15. Thereby, the strength of connection portion 15 can be further increased. FIG. 9 shows a cross section view of a metal porous body 60 in which the connection portion is formed with the intermediate layer being interposed therein. As shown in FIG. 9, in metal porous body 60, an intermediate layer 17 is sandwiched between the end portions in longitudinal direction X of two metal porous materials 10, in stacked region L of the connection portion.

Although the metal porous material used as intermediate layer 17 may be the one having the same average pore diameter as that of two metal porous materials 10, a metal porous material having a different average pore diameter can increase the tensile strength of the connection portion. This is because, when the metal porous material used as intermediate layer 17 has a different average pore diameter, the frame of the metal porous material used as intermediate layer 17 is more entangled with the frames of two metal porous materials 10.

In the metal porous body in accordance with the embodiment of the present disclosure, the tensile strength of connection portion 15 is preferably about 80% or more of the tensile strength of metal porous materials 10. In addition, the tensile strength of connection portion 15 is more preferably substantially the same as or more than the tensile strength of metal porous materials 10, and further preferably higher than the tensile strength of metal porous materials 10. As the tensile strength in connection portion 15 is increased, the metal porous body can be handled more easily. In order to increase the tensile strength of connection portion 15, it is only necessary to change the size, number, and arrangement of recess(es) 16 as appropriate, or to provide intermediate layer 17, for example. The tensile strength can be measured by using a tensile testing machine.

<Method for Manufacturing Metal Porous Body>

The method for manufacturing a metal porous body in accordance with the embodiment of the present disclosure is a method for manufacturing the metal porous body in accordance with the embodiment of the present disclosure described above, and includes an overlapping step and a connecting step. Each step will be described in detail below.

(Overlapping Step)

The overlapping step is the step of overlapping end portions in a longitudinal direction of at least two long sheet-shaped metal porous materials with each other, each of the metal porous materials having a frame with a three-dimensional network structure. As the metal porous materials, the metal porous materials described in the metal porous body in accordance with the embodiment of the present disclosure described above can be used.

When a long sheet-shaped metal porous body having a length in the longitudinal direction of several tens of meters to several hundreds of meters is manufactured by a so-called plating method, defective portions such as portions having frame chipping and poor plating may occur, although only few, due to various reasons. In such a case, the metal porous body may be cut in a direction parallel to short direction Y, at positions on the upstream side and the downstream side of a region including a defective portion, and then the obtained two metal porous bodies may be used as the metal porous materials and end portions thereof in longitudinal direction X may be overlapped with each other.

It should be noted that, as the metal porous materials, a plurality of metal porous bodies (having no defective portion) having a length in longitudinal direction X of several meters to several tens of meters may be fabricated, and the metal porous bodies may be used as the metal porous materials. In addition, the end portions in longitudinal direction X of the two metal porous materials may be overlapped with each other, with another metal porous material being interposed therebetween as an intermediate layer.

When the end portions in longitudinal direction X of the two metal porous materials are overlapped with each other, the length in longitudinal direction X of an overlapped region may be selected as appropriate, to maintain the tensile strength of the connection portion to some extent after connection, and to prevent occurrence of a slip at a conveying roller portion during conveyance as described above. When the overlapped region has a short length, the tensile strength after connection is decreased, but the region of the metal porous materials required for connection can be decreased, and a slip is less likely to occur during conveyance. In contrast, when the overlapped region has a long length, the tensile strength after connection can be increased, but the region of the metal porous materials required for connection is increased, and a joint apparatus used for connection increases in size. From these viewpoints, the length of the overlapped region is preferably about 10 mm or more and about 50 mm or less, and more preferably about 10 mm or more and about 30 mm or less, for example.

(Connecting Step)

The connecting step is the step of connecting the two metal porous materials by performing compression processing on an overlapped portion thereof using a rolling roller. Since each of the metal porous materials has a frame with the shape of a three-dimensional network structure, when the two overlapped metal porous materials are compressed, the frames of the two metal porous materials are entangled like a hook and loop fastener, forming the connection portion.

Compression is performed such that the thickness of the metal porous materials at the overlapped portion becomes equal to or less than the thickness of each of the metal porous materials before the overlapping, and further such that at least a portion of the thickness of the metal porous materials at the overlapped portion becomes thinner than the thickness of each of the metal porous materials before the overlapping. Thereby, the tensile strength of the connection portion in the metal porous body can be increased.

It should be noted that, if all the thickness of the portion where the two metal porous materials are overlapped with each other is thinner than the thickness of each of the metal porous materials before the overlapping, the conveying rollers rotate idly at the connection portion during conveyance of the metal porous body. Thus, it is necessary to set at least a portion of the thickness of the portion where the two metal porous materials are overlapped with each other to be equal to the thickness of each of the metal porous materials before the overlapping.

Preferably, the rolling roller used in the connecting step has a width longer than the length of the portion where the two metal porous materials are overlapped with each other (the length in longitudinal direction X of the metal porous materials). Thereby, the thickness of the portion where the two metal porous materials are overlapped with each other can become equal to the thickness of each of the metal porous materials before the overlapping, by single compression processing.

Figure 10:
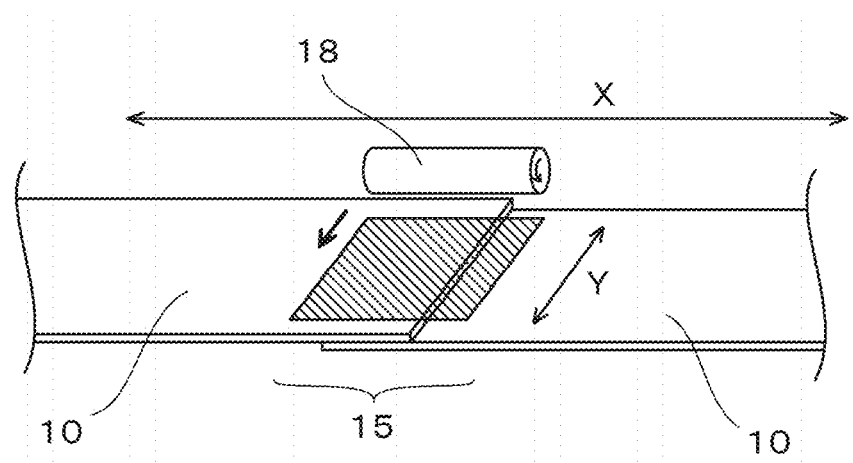
FIG. 10 is a view schematically showing one example of a method for manufacturing the metal porous body shown in FIG. 4.

FIG. 10 shows a schematic view of one example of a method for manufacturing metal porous body 30 shown in FIGS. 4 and 7.

In order to manufacture metal porous body 30, first, the end portions in longitudinal direction X of two metal porous materials 10 are overlapped with each other. Then, a rolling roller 18 is used to compress the portion where two metal porous materials 10 are overlapped with each other, to have a thickness equal to the thickness of each of metal porous materials 10 before the overlapping. Further, a shaded region in FIG. 10 is compressed to have a thickness thinner than the thickness of each of metal porous materials 10 before the overlapping.

It should be noted that, as rolling roller 18, a roller having a width longer than the length of the portion where the two metal porous materials are overlapped with each other (the length in longitudinal direction X of the metal porous materials) is used. Then, the rolling roller is moved in short direction Y of metal porous materials 10 to include all the portion where the two metal porous materials are overlapped with each other, and compresses the metal porous materials.

Thereby, metal porous body 30 having connection portion 15 in which recess 16 is formed to have a length longer than the length of stacked region L where the end portions in longitudinal direction X of metal porous materials 10 are stacked, and is also formed to cover both end portions in longitudinal direction X of stacked region L, as shown in FIGS. 4 and 7, can be manufactured.

Figure 11:
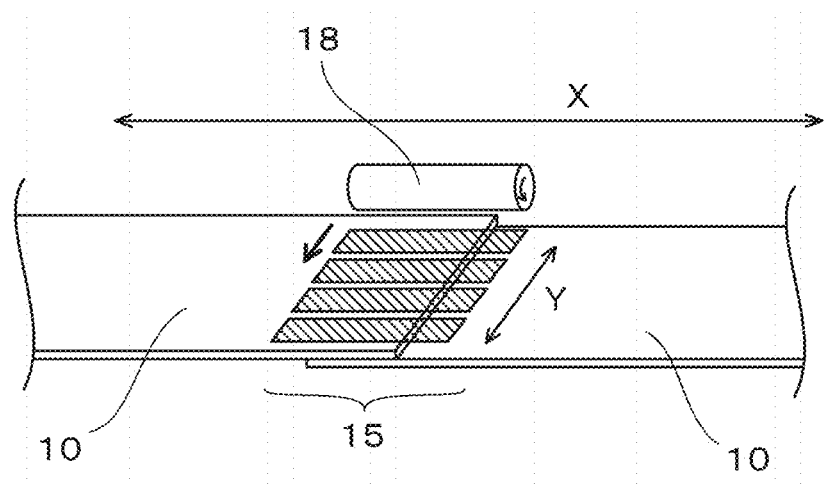
FIG. 11 is a view schematically showing one example of a method for manufacturing the metal porous body shown in FIG. 5.

FIG. 11 shows a schematic view of one example of a method for manufacturing metal porous body 40 shown in FIG. 5.

Metal porous body 40 can be manufactured in basically the same way as in metal porous body 30 described above. The difference from the method for manufacturing metal porous body 30 is that regions serving as recesses 16 (shaded regions in FIG. 11) are arranged at regular intervals in short direction Y. Thereby, metal porous body 40 in which a plurality of recesses 16 increase the tensile strength of the connection portion and a portion other than recesses 16 can come into contact with the conveying rollers can be manufactured.

Figure 12:
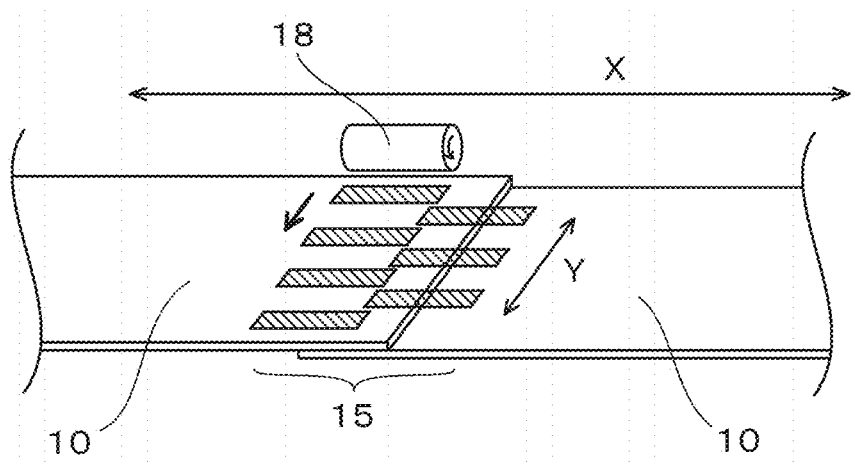
FIG. 12 is a view schematically showing one example of a method for manufacturing the metal porous body shown in FIG. 6.

FIG. 12 shows a schematic view of one example of a method for manufacturing metal porous body 50 shown in FIGS. 6 and 8.

Metal porous body 50 can also be manufactured in basically the same way as in metal porous body 30 described above. The difference from the method for manufacturing metal porous body 30 is that shaded regions in FIG. 12 (regions serving as recesses 16) are arranged in a checkered pattern. Thereby, metal porous body 50 in which a plurality of recesses 16 increase the tensile strength of the connection portion and a portion other than recesses 16 can come into contact with the conveying rollers can be manufactured.

Figure 13:
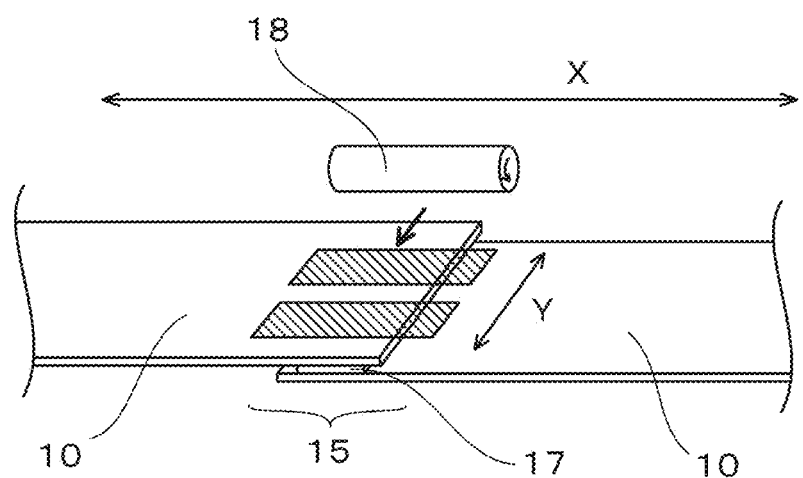
FIG. 13 is a view schematically showing one example of a method for manufacturing the metal porous body shown in FIG. 9.

FIG. 13 shows a schematic view of one example of a method for manufacturing metal porous body 60 shown in FIG. 9.

Metal porous body 60 is a metal porous body in which the end portions in longitudinal direction X of two metal porous materials 10 overlap with each other, with intermediate layer 17 being interposed therebetween, in connection portion 15. In order to manufacture metal porous body 60, it is only necessary to interpose another metal porous material as the intermediate layer, between the end portions in longitudinal direction X of two metal porous materials 10, in the overlapping step. Although the metal porous material used as the intermediate layer may be the one having the same average pore diameter as that of two metal porous materials 10, a metal porous material having a different average pore diameter can further increase the tensile strength of the connection portion. That is, by using the metal porous material having an average pore diameter different from that of two metal porous materials 10 as the intermediate layer, the frames of a plurality of metal porous materials 10 are easily entangled, and the tensile strength of the connection portion is further increased.

It should be noted that, although regions serving as recesses 16 (shaded regions in FIG. 11) are arranged at regular intervals in short direction Y in the example shown in FIG. 13, only one region can be arranged at a central portion of the connection portion as shown in FIG. 10, or regions can be arranged in a checkered pattern as shown in FIG. 12.

EXAMPLES

In the following, the present disclosure will be described in more detail based on Examples. However, these Examples are given by way of illustration, and the metal porous body and the method for manufacturing the same in the present disclosure is not limited thereto. The scope of the present invention is defined by the scope of the claims, and includes any modifications within the scope and meaning equivalent to the scope of the claims.

Example 1

Eight sheets of Celmet (manufactured by Sumitomo Electric Industries, Ltd., "Celmet" is a registered trademark) made of nickel and having a length in longitudinal direction X of 80 cm, a length in short direction Y of 20 cm, and a thickness of 1 mm were prepared. Each sheet of Celmet made of nickel had a frame with a three-dimensional network structure, and had an average pore diameter of 400 µM, a porosity of 98%, and a basis weight of 350 g/m$^2$. These eight sheets of Celmet were used as metal porous materials.

The metal porous materials were stacked such that end portions in longitudinal direction X overlapped with each other by 30 mm, and then compression processing was performed using a rolling roller such that a stacked portion had a thickness of 1 mm. Further, a recess was formed at a central portion of a connection portion to have a thickness of 0.5 mm as shown in FIG. 4, and thereby a metal porous body No. 1 was manufactured.

When the tensile strength of the connection portion in metal porous body No. 1 was measured as described below, the tensile strength thereof was 30 MPa. It should be noted that, when the tensile strength of Celmet used as the metal porous material was measured for reference, the tensile strength thereof was 25 MPa.

Example 2

A metal porous body No. 2 was manufactured as in Example 1, except that it was fabricated such that recesses were arranged at regular intervals in short direction Y as shown in FIG. 5.

When the tensile strength of the connection portion in metal porous body No. 2 was measured as described below, the tensile strength thereof was 32 MPa.

Example 3

A metal porous body No. 3 was manufactured as in Example 1, except that it was fabricated such that recesses were arranged in a checkered pattern as shown in FIG. 6.

When the tensile strength of the connection portion in metal porous body No. 3 was measured as described below, the tensile strength thereof was 30 MPa.

Example 4

A metal porous body No. 4 was manufactured as in Example 2, except that an intermediate layer with a size of 20 mm×20 cm×1.0 mm was interposed when the metal porous materials were stacked such that the end portions in longitudinal direction X overlapped with each other by 30 mm.

It should be noted that, as the intermediate layer, Celmet made of nickel and having an average pore diameter of 500 μm, a porosity of 98%, and a basis weight of 350 g/m² was used.

When the tensile strength of the connection portion in metal porous body No. 4 was measured as described below, the tensile strength thereof was 40 MPa.

Comparative Example 1

A metal porous body No. A was fabricated as in Example 1, except that two metal materials each having a nonwoven fabric-shaped frame were prepared and used in Example 1.

It should be noted that each metal material having a nonwoven fabric-shaped frame was fabricated by performing conductive treatment on a surface of a frame of a nonwoven fabric-shaped resin molded body, electroplating the surface of the frame with nickel, and removing the resin molded body. In addition, each metal material had a length in longitudinal direction X of 100 cm, a length in short direction Y of 20 cm, and a thickness of 1 mm.

When the tensile strength of the connection portion in metal porous body No. A was measured as described below, the tensile strength thereof was 10 MPa. Since metal porous body No. A used the nonwoven fabric-shaped metal materials, the frames thereof were not entangled successively even though a recess was provided, and the metal materials were not able to be connected.

Comparative Example 2

A metal porous body No. B was fabricated as in Example 1, except that, instead of Celmet used in Example, 1, two sheets of Celmet made of nickel and having a length in longitudinal direction X of 100 cm, a length in short direction Y of 20 cm, and a thickness of 1 mm were prepared and used as metal porous materials, and a recess was not formed.

When the tensile strength of the connection portion in metal porous body No. B was measured as described below, the tensile strength thereof was 15 MPa. Since a recess was not provided in the connection portion in metal porous body No. B, the frames were not entangled sufficiently, and thereby the tensile strength was lower than that of the connection portion in the metal porous body in the Example.

—Evaluation—

<Tensile Strength>

As a tensile testing machine, Autograph manufactured by Shimadzu Corporation was used.

Each of the connection portions in metal porous bodies Nos. 1 to 4 in the Examples and metal porous bodies Nos. A and B in the Comparative Examples was cut out to a size having a length (in longitudinal direction X) of 150 mm and a width (in short direction Y) of 20 cm to fabricate a test piece, and a tensile test was performed thereon with a gauge length when both ends of the test piece were gripped by grippers (a length excluding the length of the gripped ends) being set to 100 mm. The strain rate was set to 1 min/min. Here, the tensile strength was defined as a maximum stress during the tensile test.

<Conveyance>

When metal porous bodies Nos. 1 to 4 in the Examples were conveyed using the conveying rollers, it was confirmed that each metal porous body sufficiently comes into contact with the conveying rollers also in the connection portion, and can be conveyed satisfactorily.

REFERENCE SIGNS LIST

10: metal porous material; 11: frame; 12: metal film; 13: inside of the frame; 14: pore portion; 15: connection portion; 16: recess; 17: intermediate layer; 18: rolling roller; 20: metal porous body; 30: metal porous body; 40: metal porous body; 50: metal porous body; 60: metal porous body; X: longitudinal direction; Y: short direction; Z: thickness direction; L: stacked region where end portions in the longitudinal direction of the metal porous materials are stacked; M: length of the recess in the longitudinal direction of the metal porous body.

The invention claimed is:

1. A metal porous body having a connection portion where end portions in a longitudinal direction of at least two long sheet-shaped metal porous materials are connected in a manner overlapping with each other,
    each of the metal porous materials having a frame with a three-dimensional network structure,
    the metal porous body having a recess with a thickness thinner than a thickness of each of the metal porous materials, in the connection portion,
    the frames of the at least two metal porous materials being entangled with each other, in the recess.

2. The metal porous body according to claim 1, wherein the end portions in the longitudinal direction of the two metal porous materials overlap with each other, with another metal porous material being interposed therebetween as an intermediate layer, in the connection portion.

3. The metal porous body according to claim 2, wherein an average pore diameter of the metal porous material constituting the intermediate layer is different from an average pore diameter of the connected two metal porous materials.

4. The metal porous body according to claim 1, wherein the metal porous body has a length in the longitudinal direction of 100 m or more, and the number of the connection portions is 10 or less per 100 m of the length in the longitudinal direction of the metal porous body.

5. The metal porous body according to claim 1, wherein the metal porous body has a plurality of the recesses, in the connection portion.

6. The metal porous body according to claim 1, wherein the metal porous body has a plurality of the recesses, and the plurality of the recesses are arranged at regular intervals, in the connection portion.

7. The metal porous body according to claim 1, wherein the metal porous body has a plurality of the recesses, and the plurality of the recesses are arranged in a checkered pattern, in the connection portion.

8. The metal porous body according to claim 1, wherein a tensile strength of the connection portion is higher than a tensile strength of the metal porous materials.

9. A method for manufacturing a metal porous body formed by connecting end portions in a longitudinal direction of at least two long sheet-shaped metal porous materials in a manner overlapping with each other, each of the metal porous materials having a frame with a three-dimensional network structure, the method comprising:

overlapping the end portions in the longitudinal direction of the metal porous materials with each other; and
  connecting the end portions in the longitudinal direction of the two metal porous materials, by performing processing using a rolling mill roll such that a thickness of the metal porous materials at an overlapped portion becomes equal to a thickness of each of the metal porous materials before the overlapping, and further performing processing using the rolling mill roll such that at least a portion of the thickness of the metal porous materials at the overlapped portion becomes thinner than the thickness of each of the metal porous materials before the overlapping.

\* \* \* \* \*